US008663741B2

(12) United States Patent  
Dams et al.

(10) Patent No.: US 8,663,741 B2
(45) Date of Patent: Mar. 4, 2014

(54) METHOD FOR TREATING WHEEL RIMS AND COMPOSITION FOR USE THEREIN

(75) Inventors: Rudolf J. Dams, Antwerp (BE); Bernd Kuehneweg, Duesseldorf (DE); Leonardus Doelen, Moenchengldbach (DE); Frank Koehler, Essen (DE); Christoph Furtak, Hilden Meide (DE); Frans A. Audenaert, Kaprijke (BE)

(73) Assignee: 3M Innovative Properties Company, St. Paul, MN (US)

( * ) Notice: Subject to any disclaimer, the term of this patent is extended or adjusted under 35 U.S.C. 154(b) by 175 days.

(21) Appl. No.: 13/062,233

(22) PCT Filed: Sep. 23, 2009

(86) PCT No.: PCT/US2009/058028
§ 371 (c)(1),
(2), (4) Date: Mar. 4, 2011

(87) PCT Pub. No.: WO2010/036705
PCT Pub. Date: Apr. 1, 2010

(65) Prior Publication Data
US 2011/0189404 A1  Aug. 4, 2011

(30) Foreign Application Priority Data
Sep. 25, 2008  (GB) ................................ 0817578.8

(51) Int. Cl.
*B05D 3/02* (2006.01)
(52) U.S. Cl.
USPC ........................................ 427/387; 427/385.5
(58) Field of Classification Search
None
See application file for complete search history.

(56) References Cited

U.S. PATENT DOCUMENTS

| | | | |
|---|---|---|---|
| 3,388,144 A | 6/1968 | Musolf et al. | |
| 3,436,251 A | 4/1969 | Rees | |
| 4,230,816 A | 10/1980 | Martin | |
| 4,239,674 A | 12/1980 | Homan et al. | |
| 4,467,068 A | 8/1984 | Maruyama et al. | |
| 4,725,630 A | 2/1988 | Magee et al. | |
| 4,761,459 A | 8/1988 | Matsuo et al. | |
| 4,902,742 A | 2/1990 | Yamamoto et al. | |
| 4,911,954 A | 3/1990 | Tatsuno et al. | |
| 4,987,180 A | 1/1991 | Ohata et al. | |
| 5,032,460 A | 7/1991 | Kantner et al. | |
| 5,061,481 A | 10/1991 | Suzuki et al. | |
| 5,212,211 A | 5/1993 | Welch, II et al. | |
| 5,274,159 A * | 12/1993 | Pellerite et al. | 556/485 |
| 5,387,663 A | 2/1995 | McGee et al. | |
| 5,468,477 A | 11/1995 | Kumar et al. | |
| 5,670,597 A | 9/1997 | Stepp et al. | |
| 5,760,109 A | 6/1998 | Inokuchi et al. | |
| 5,814,703 A | 9/1998 | Yamaya et al. | |
| 6,159,537 A | 12/2000 | Crandall | |
| 6,251,981 B1 | 6/2001 | Tanaka et al. | |
| 6,258,969 B1 | 7/2001 | Sawai et al. | |
| 6,288,198 B1 | 9/2001 | Mechtel et al. | |
| 6,403,225 B1 | 6/2002 | Narisawa et al. | |
| 6,476,095 B2 | 11/2002 | Simendinger, III | |
| 6,562,324 B1 | 5/2003 | Kumar et al. | |
| 6,593,288 B2 | 7/2003 | Aubay | |
| 6,599,976 B2 | 7/2003 | Kobayashi et al. | |
| 6,630,205 B2 | 10/2003 | Brueck et al. | |
| 6,660,706 B1 | 12/2003 | Koester et al. | |
| 6,679,943 B1 * | 1/2004 | Newton et al. | 106/287.14 |
| 6,703,358 B1 | 3/2004 | Aubay et al. | |
| 6,797,391 B2 | 9/2004 | Shibato et al. | |
| 7,022,379 B2 | 4/2006 | Winterton et al. | |
| 7,030,275 B2 | 4/2006 | Liu | |
| 7,166,361 B2 | 1/2007 | Baba et al. | |
| 7,173,509 B2 | 2/2007 | Kumano et al. | |
| 7,501,472 B2 | 3/2009 | Steidl et al. | |
| 7,622,157 B2 | 11/2009 | Falk et al. | |
| 2002/0018900 A1 | 2/2002 | Kron et al. | |
| 2002/0091221 A1 | 7/2002 | Leempoel et al. | |
| 2005/0009956 A1 | 1/2005 | Kimura | |
| 2005/0196627 A1 | 9/2005 | Mager et al. | |
| 2005/0239779 A1 | 10/2005 | Wilk | |
| 2005/0249955 A1 * | 11/2005 | Gedeon et al. | 428/421 |
| 2006/0062923 A1 | 3/2006 | Dilley et al. | |
| 2006/0286813 A1 | 12/2006 | Meredith et al. | |
| 2007/0092739 A1 * | 4/2007 | Steele et al. | 428/450 |
| 2007/0099002 A1 | 5/2007 | Walters et al. | |
| 2007/0196672 A1 | 8/2007 | Brand et al. | |

FOREIGN PATENT DOCUMENTS

| | | |
|---|---|---|
| CA | 1 233 290 | 2/1988 |
| DE | 198 30 788 | 1/2000 |
| DE | 103 10 827 | 9/2004 |
| DE | 102004029911 | 1/2005 |
| EP | 1006131 | 11/1999 |
| EP | 1785457 | 5/2007 |

(Continued)

OTHER PUBLICATIONS

Abstracts and raw machine translation of JP2000-093893, Apr. 2000.*
Original patent and translation of JP 2000-093893, Apr. 2000.*
Parkin, I. P., Palgrave, R. C., Self-cleaning coatings. *Journal of Materials Chemistry* 15, 1689-1695 (2005).
Wagner, Oliver et al., (2002), How to Control Dirt Pick-Up of Exterior Coatings, *Macromol. Symp.* 187, 447-458 (2002).
Kasemann, R., et al., Coatings for mechanical and chemical protection based on organic-inorganic sol-gel nanocomposites, *New J. Chem.*, 1994, vol. 18, No. 10, 1117-1123, (1994).

(Continued)

*Primary Examiner* — Erma Cameron
(74) *Attorney, Agent, or Firm* — Dena M. Ehrich; James A. Baker

(57) ABSTRACT

There is provided a method of treatment including (i) applying a treatment composition to at least a portion of the surface of a wheel rim and (ii) allowing a thus applied treatment composition to cure. There is also provided compounds and compositions useful in the method.

8 Claims, No Drawings

(56) References Cited

FOREIGN PATENT DOCUMENTS

| | | |
|---|---|---|
| EP | 1964888 | 3/2008 |
| JP | 7188609 | 7/1995 |
| JP | 8003247 | 1/1996 |
| JP | 8060081 | 3/1996 |
| JP | 10265713 | 10/1998 |
| JP | 2002 069363 | 3/2002 |
| JP | 2003 171787 | 6/2003 |
| JP | 2005-226060 | 8/2005 |
| WO | WO 01/27181 | 4/2001 |
| WO | WO 01/98419 | 12/2001 |
| WO | WO 03/072667 | 2/2003 |
| WO | WO 2004/094531 | 4/2004 |
| WO | WO 2004/039904 | 5/2004 |

OTHER PUBLICATIONS

Yoo, Dongsik, et al., Controlling Bilayer Composition and Surface Wettability of Sequentially Adsorbed Multilayers of Weak Polyelectrolytes, *Macromolecules*, 31, 4309-4316 (1998).

Bertrand, P., et al., Ultrathin polymer coatings by complexation of polyelectrolytes at interfaces: suitable materials, structure and properties, *Marcromol. Rapid Commun.* 21, 319-348 (2000).

* cited by examiner

METHOD FOR TREATING WHEEL RIMS AND COMPOSITION FOR USE THEREIN

CROSS REFERENCE TO RELATED APPLICATIONS

This application is a national stage filing under 35 U.S.C. 371 of PCT/US2009/058028, filed Sep. 23, 2009, which claims priority to Great Britain Application No. 0817578.8, filed Sep. 25, 2008, the disclosures of which are incorporated by reference in their entirety herein.

BACKGROUND OF THE INVENTION

The use of aluminum wheel rims in automobile construction has increased greatly in recent years. The lighter aluminum rims offer weight advantages over steel rims and so enable fuel savings, and further the aluminum rims are used all for esthetic reasons, since they give the vehicle a high-value and refined appearance. To provide an improved appearance and enhanced weather resistance, aluminum wheel rims are generally coated with an organic coating, typically a transparent or colored thermosetting coating, applied as one or more coatings.

WO2004039904 discloses a coating solution comprising an inorganic or organic polysilazane. By applying the coating solution onto the surface of base materials such as metals, plastics, glass, ceramic, wood, cement, mortar, bricks, etc., a silica coating strongly adhered to the base materials can be formed which are said to provide corrosion resistance and anti-scratch properties and simultaneously characteristics such as abrasion resistant, long-lasting anti-fouling properties, wetting properties to water, sealing properties, chemical resistance, oxidation resistance, physical barrier effect, heat resistance, fire resistance and antistatic properties.

WO2004094531 relates to the use of a solution of a polysilazane having a number-average molar mass of from 150 to 150 000 g/mol, a solvent and a catalyst, as a primer for the coating of a surface with fluorosilanes or with fluorine-containing condensates. The primer is used for substrates, such as for example metals, plastics, paints, and resins, that cannot be provided with a permanent hydrophobic and oleophobic effect with the aid of fluorosilanes or of fluorine-containing condensates.

US20070196672 discloses a surface coating comprising at least one type of perhydropolysilazane having a number-average molecular weight of from 150 to 150 000 g/mol, a solvent and a catalyst and, possibly one or more co-binding agents. The hardened coating has thickness of at least 1 micrometer, preferably ranging from 2 to 20 micrometers. The coating is said to be suitable for protecting rims, in particular, aluminum rims.

US 2007/0099002 relates to coating compositions that include a polymer comprising silanol functional groups. The coating compositions produce thin coating films that exhibit hydrophilic properties and therefore self-cleaning properties. One exemplary application involves the use of the compositions to coat automobile wheel rims.

SUMMARY OF THE INVENTION

Wheel rims and in particular aluminium wheel rims are generally vulnerable to soiling and to scratches. It has been observed that dirt such as brake dust may deposit on the aluminum wheel rim and over time penetrate into the coating making it hard to remove the dirt. Scratches may occur when e.g. snow chains are used or when cleaning of the aluminum wheel rims is done with abrasive tools, such as with a brush. It would be desirable to find further methods and compositions for the treatment of wheel rims, in particular aluminum wheel rims in order to render them stain, dirt or dust repellent and make them easy-to-clean. Desirably, such method can yield durable coatings with improved properties. It would further be desirable to find compositions that can be manufactured in an easy and convenient way and that preferably can be applied in an easy, convenient and cost effective way. Desirably, the compositions have environmentally beneficial properties. It would furthermore be desirable to find coating compositions that can be applied to wheel rims to which an organic coating has already been applied. Desirably, the coatings provide good or strong adhesion characteristics to wheel rims, in particular wheel rims that have already been provided with an organic coating.

The present invention provides in one aspect a method of treatment comprising (i) applying a treatment composition to at least a portion of the surface of a wheel rim and (ii) allowing a thus applied treatment composition to cure, said treatment composition comprising dissolved or dispersed in an organic solvent:

(a) at least one polymer comprising a polysiloxane segment or a segment that is fluorinated, in particular a fluorinated backbone segment, and said polymer having at least one —SiY functional group wherein Y represents a hydrolysable group and wherein said —SiY group is comprised in end groups of the polymer or side groups of said polymer; and (b) at least one hydrolysable silane corresponding to the formula (I) or hydrolysates or condensates thereof:

$$Q_n SiG_{4-n} \qquad (I)$$

wherein Q represents a hydrocarbon group that can optionally be substituted, G represents a hydrolysable group and n is 0, 1 or 2; or as an alternative to or in addition to components (a) and (b), (c) condensation products of (i) said polymer and (ii) said hydrolysable silane according to formula (I) or hydrolysates or condensates of said hydrolysable silane according to formula (I).

In connection with the present invention, the term "end group" of a polymer is used to identify the groups that are at a terminal position of the polymer backbone. The term "side group" of a polymer is used to indicate groups that are pending on the backbone and are hence typically contained in a repeating unit of the polymer.

In connection with the present invention, the term "or" should be interpreted as including either of the alternatives on their own as well as including a combination of the listed alternatives. Hence, as an example a composition comprising A or B is intended to include compositions with only A or only B as well as compositions including both A and B.

In a particular aspect, the polymer comprises one or more reaction products of (i) a polysiloxane of which the end groups comprise an isocyanate reactive group, (ii) a di-isocyanate and (iii) an organic compound having (a) at least one —SiY group wherein Y has the meaning as defined above, and (b) an isocyanate reactive group.

In a further particular aspect, the polymer comprises one or more reaction products of a free radical reaction, in particular a free radical polymerization of an ethylenically unsaturated monomer having at least one —SiY group in the presence of a polysiloxane having two or more mercapto groups.

It has been found that wheel rims that have been treated as described above typically have high oil and water repellent properties. The coated wheel rims generally may have excellent abrasion resistance, less dirt pick-up and/or very good easy-to-clean properties. Dirt, especially coming from brake dust typically accumulates less and can generally be easily removed using water, optionally in combination with a soft wipe, normally without the need for harsh cleaners, detergents or extensive labor. Additionally, the cleaning frequency may be reduced. Improving the ease of cleaning of the wheel rim while using less or no detergents, is not only a desire by the end consumer, but has also a positive impact on the environment.

Furthermore, typically the method can be used in an easy and safe way and is compatible with existing manufacturing methods and may be applied to wheel rims that have already been provided with one or more organic coatings. The compositions used in the method typically spread well on the surface of the wheel rim, with the result that typically uniform properties can be achieved over the whole surface of the wheel rim. The method provides for clear coatings that have a minimal impact on the appearance of the wheel rim.

In another aspect, the invention provides a compound obtainable by a free radical reaction of an ethylenically unsaturated monomer having at least one —SiY functional group, wherein Y represents a hydrolysable group, in the presence of a chain transfer agent that comprises a mercapto group and an isocyanate reactive group.

In yet another aspect, the invention provides a compound comprising one or more reaction products of (i) a polysiloxane of which the end groups comprise an isocyanate reactive group, (ii) a di-isocyanate and (iii) a compound obtainable by a free radical reaction of an ethylenically unsaturated monomer having at least one —SiY functional group, wherein Y represents a hydrolysable group, in the presence of a chain transfer agent that comprises a mercapto group and an isocyanate reactive group.

In still another aspect the invention provides a compound obtainable by a free radical reaction, in particular a free radical polymerization of an ethylenically unsaturated monomer having at least one —SiY functional group in the presence of a polysiloxane having a mercapto group in each of the end groups.

The invention in a further aspect provides a compound obtainable by a free radical reaction of an ethylenically unsaturated monomer having at least one —SiY functional group in the presence of a polysiloxane having two of more mercapto groups, at least one of which is contained in a side group of the polymer.

In yet another aspect the invention provides a coating composition comprising dispersed or dissolved in an organic solvent:
(a) at least one polymer selected from the group of
  a. a polymer comprising one or more reaction products of (i) a polysiloxane of which the end groups comprise an isocyanate reactive group, (ii) a di-isocyanate and (iii) a compound obtainable by a free radical polymerization of an ethylenically unsaturated monomer having at least one —SiY functional group, wherein Y represents a hydrolysable group, in the presence of a chain transfer agent that comprises a mercapto group and an isocyanate reactive group.
  b. a polymer obtainable by a free radical reaction of an ethylenically unsaturated monomer having at least one —SiY functional group in the presence of a polysiloxane having a mercapto group in each of the end groups; and
  c. a polymer obtainable by a free radical reaction of an ethylenically unsaturated monomer having at least one —SiY functional group in the presence of a polysiloxane having two of more mercapto groups, at least one of which is contained in a side group of the polymer
(b) at least one hydrolysable silane corresponding to formula (I) or hydrolysates or condensates thereof:

$$Q_n SiG_{4-n} \qquad (I)$$

wherein Q represents a hydrocarbon group that can optionally be substituted, G represents a hydrolysable group and n is 0, 1 or 2; or as an alternative to or in addition to components (a) and (b),
(c) condensation products of (i) said polymer and (ii) said hydrolysable silane according to formula (I) or hydrolysates or condensates of said hydrolysable silane according to formula (I).

In still a further aspect, the invention provides a coating composition comprising dispersed or dissolved in an organic solvent:
(a) at least one polymer comprising a polysiloxane segment and having a plurality of —SiY functional groups wherein Y represents a hydrolysable group and wherein said —SiY groups are comprised in end groups and/or side groups of said polymer and wherein the amount of hydrolyzable groups Y bonded to an Si atom is on average more than 6 per polymer; and
(b) at least one hydrolysable silane corresponding to the formula (I) or hydrolysates or condensates thereof:

$$Q_n SiG_{4-n} \qquad (I)$$

wherein Q represents a hydrocarbon group that can optionally be substituted, G represents a hydrolysable group and n is 0, 1 or 2; or as an alternative to or in addition to components (a) and (b),
(c) condensation products of (i) said polymer and (ii) said hydrolysable silane according to formula (I) or hydrolysates or condensates of said hydrolysable silane according to formula (I).

In the following, embodiments of the invention are summarized:
1. Method of treatment comprising (i) applying a treatment composition to at least a portion of the surface of a wheel rim and (ii) allowing a thus applied treatment composition to cure, said treatment composition comprising dissolved or dispersed in an organic solvent:
  (a) at least one polymer comprising a polysiloxane segment or a segment that is fluorinated and said polymer having at least one —SiY functional group wherein Y represents a hydrolysable group and wherein said —SiY group is comprised in end groups of the polymer and/or side groups of said polymer; and
  (b) at least one hydrolysable silane corresponding to the formula (I) or hydrolysates or condensates thereof:

$$Q_n SiG_{4-n} \qquad (I)$$

wherein Q represents a hydrocarbon group that can optionally be substituted, G represents a hydrolysable group and n is 0, 1 or 2; or as an alternative to or in addition to components (a) and (b),
  (c) condensation products of (i) said polymer and (ii) said hydrolysable silane according to formula (I) or hydrolysates or condensates of said hydrolysable silane according to formula (I).
2. Method according to item 1 wherein said hydrolysable groups Y and G are independently selected from alkoxy, aryloxy, acyloxy and halogens.
3. Method according to item 1 or 2 wherein the total amount of solids is between 1% and 40% by weight.

4. Method according to any of the previous items wherein the amount of (a)+(c) to the total amount of solids is at least 1%, preferably at least 5% and up to 30% by weight.

5. Method according to any of the previous items wherein the composition further comprises an organic or inorganic acid as a catalyst and/or wherein said catalyst is separately applied to said surface of said wheel rim.

6. Method according to any of the previous items wherein the average number of hydrolysable Y groups connected to a Si atom in said polymer is more than 6.

7. Method according to any of the previous items wherein the polymer comprises polysiloxane segments and wherein said segments have an average number of SiO units of 5 to 200.

8. Method according to any of the previous items wherein the organic solvent is an alcohol.

9. Method according to any of the previous items wherein said composition further comprises a polysiloxane based surfactant.

10. Method according to any of the previous items wherein said polymer is a polysiloxane based polymer comprising repeating units of the formula —$(R)_2SiO$—, wherein R represents an alkyl group of 1 to 4 carbon atoms or an aryl group.

11. Method according to any of the previous items wherein said polymer comprises one or more reaction products of (i) a polysiloxane of which the end groups comprise an isocyanate reactive group, (ii) a di-isocyanate and (iii) an organic compound having (a) at least one —SiY group wherein Y has the meaning as defined in any of the previous items, and (b) an isocyanate reactive group.

12. Method according to item 11 wherein said organic compound corresponds to the formula (II):

$$T[\text{-}(CH_2)_s\text{—}SiY_3]_h \quad (II)$$

wherein s is 1, 2, 3 or 4, h is 1 or 2, T represents an isocyanate reactive group and wherein Y represents an alkoxy group.

13. Method according to item 11 wherein said organic compound is obtainable by free radical polymerization of an ethylenically unsaturated monomer having at least one —SiY group, in the presence of chain transfer agent that comprises a mercapto group and an isocyanate reactive group.

14. Method according to item 13 wherein said chain transfer agent corresponds to the formula:

$$HS\text{—}(CH_2)_f\text{—}OH$$

wherein f is 2, 3 or 4.

15. Method according to item 13 or 14 wherein said monomer corresponds to the formula:

$$CH_2\text{=}C(R^a)\text{—}COO\text{—}(CH_2)_g\text{—}SiY_3$$

wherein g is 1, 2, 3 or 4, Y is an alkoxy group and $R^a$ represents H or $CH_3$.

16. Method according to any of items 1 to 10 wherein said polymer comprises one or more reaction products of a free radical reaction of an ethylenically unsaturated monomer having at least one —SiY group in the presence of a polysiloxane having two or more mercapto groups.

17. Method according to item 16 wherein said polysiloxane corresponds to the formula:

$$HS\text{—}(CH_2)_a\text{—}[Si(R_2)O]_p\text{—}Si(R_2)\text{—}(CH_2)_b\text{—}SH$$

wherein a and b are independently 1, 2, 3 or 4, p represents a value of 5 to 200 and R is an alkyl group of 1 to 4 carbon atoms.

18. Method according to item 16 wherein said polysiloxane corresponds to the formula:

$$W^1\text{—}[Si(R_2)O]_i\text{—}[Si(RR^1)O]_j\text{—}W^2$$

wherein i has a value between 5 and 150 and wherein j has a value between 2 and 50, R represents an alkyl group of 1 to 4 carbon atoms, $R^1$ represents —B—SH wherein B is selected from C1-C10 alkylene and aralkylene having at least 10 carbons and $W^1$ and $W^2$ represent an end group that may optionally contain a mercapto group.

19. Method according to item 16, 17 or 18 wherein said monomer has the formula as defined in item 15.

20. Method according to any of the previous items wherein said polymer further comprises one or more segments of a polyoxyalkylene in which the oxyalkylene units have from 1 to 4 carbon atoms.

21. Method according to any of the previous items wherein said surface of said wheel rim to which said composition is applied comprises an organic coating.

22. Method according to any of the previous items wherein the composition further comprises a compound having at least one —Si-$G^1$ functional group wherein $G^1$ represents a hydrolysable group and wherein said compound does not contain polysiloxane segments or segments that are fluorinated.

23. Compound obtainable by a free radical polymerization of an ethylenically unsaturated monomer having at least one —SiY functional group, wherein Y represents a hydrolysable group, in the presence of chain transfer agent that comprises a mercapto group and an isocyanate reactive group.

24. Compound comprising one or more reaction products of (i) a polysiloxane of which the end groups comprise an isocyanate reactive group, (ii) a di-isocyanate and (iii) a compound a defined in item 23.

25. Compound obtainable by a free radical reaction of an ethylenically unsaturated monomer having at least one —SiY functional group in the presence of a polysiloxane having a mercapto group in each of the end groups.

26. Compound obtainable by a free radical of an ethylenically unsaturated monomer having at least one —SiY functional group in the presence of a polysiloxane having two of more mercapto groups, at least one of which is contained in a side group of the polymer and wherein the polysiloxane has an average number of SiO units of 5 to 200.

27. Coating composition comprising dispersed or dissolved in an organic solvent:
(a) at least one compound as defined in any of items 24, 25 or 26; and
(b) at least one hydrolysable silane corresponding to the formula (I) or hydrolysates or condensates thereof:

$$Q_nSiG_{4-n} \quad (I)$$

wherein Q represents a hydrocarbon group that can optionally be substituted, G represents a hydrolysable group and n is 0, 1 or 2; or as an alternative to or in addition to components (a) and (b),
(c) condensation products of (i) said compound and (ii) said hydrolysable silane according to formula (I) or hydrolysates or condensates of said hydrolysable silane according to formula (I).

28. Coating composition comprising dispersed or dissolved in an organic solvent:
(a) at least one polymer comprising a polysiloxane segment and having a plurality of —SiY functional groups wherein Y represents a hydrolysable group and wherein said —SiY groups are comprised in end groups and/or side groups of said polymer and wherein the amount of hydrolyzable groups Y bonded to an Si atom is on average more than 6 per polymer; and
(b) at least one hydrolysable silane corresponding to the formula (I) or hydrolysates or condensates thereof:

$$Q_nSiG_{4-n} \quad (I)$$

wherein Q represents a hydrocarbon group that can optionally be substituted, G represents a hydrolysable group and n is 0, 1 or 2; or as an alternative to or in addition to components (a) and (b), (c) condensation products of (i) said polymer and (ii) said hydrolysable silane according to formula (I) or hydrolysates or condensates of said hydrolysable silane according to formula (I).

DETAILED DESCRIPTION

The polymer used in the method of treatment has at least one —SiY functional group wherein Y represents a hydrolysable group and wherein said —SiY group is comprised in end groups of the polymer and/or side groups of said polymer.

The term 'hydrolysable group' in connection with the present invention refers to a group which either is directly capable of undergoing condensation reactions under appropriate conditions or which is capable of hydrolyzing under appropriate conditions, thereby yielding a compound, which is capable of undergoing condensation reactions. Hydrolysis and condensation reactions typically occur in wet or humid conditions, optionally in the presence of a condensation catalyst. Examples of hydrolysable groups include halide groups, such as chlorine, bromine, iodine or fluorine, alkoxy groups —OR' (wherein R' represents an alkyl group, preferably containing 1 to 6, more preferably 1 to 4 carbon atoms and which may optionally be substituted by one or more halogen atoms), acyloxy groups —O—(CO)—R" (wherein R" is as defined for R'), aryloxy groups —OR''' (wherein R''' represents an aryl moiety, preferably containing 6 to 12, more preferably containing 6 to 10 carbon atoms, which may be optionally substituted by one or more substituents independently selected from halogens and C1-C4 alkyl groups which may optionally be substituted by one or more halogen atoms). In the above formulae R', R", and R''' may include branched structures.

Particular examples of hydrolysable groups include alkoxy groups, such as methoxy, ethoxy, propoxy and butoxy groups, chlorine and an acetoxy group. Particularly preferred hydrolysable groups include methoxy and ethoxy groups.

The polysiloxane segments include repeating units of silicon and oxygen atoms (—SiO—). In a particular embodiment, the polysiloxane segments have an average number of —SiO— units of 5 to 200, more in particular of 6 to 100. The segments can form a linear or branched backbone. In a preferred embodiment, the polymer comprises repeating units of the formula
—(R)$_2$SiO—, optionally in combination with repeating units of the formula —(RR$^1$)SiO—, wherein the groups R independently represent an alkyl group of 1 to 4 carbon atoms or an aryl group and R$^1$ represents a side group.

The polymer comprising polysiloxane segments can be prepared according to different methods.

In one embodiment of the invention, the polymer comprises one or more reaction products of (i) a polysiloxane of which the end groups comprise an isocyanate reactive group, (ii) a di-isocyanate and (iii) an organic compound having (a) one or more —SiY groups wherein Y represents a hydrolysable group and (b) an isocyanate reactive group With the term 'isocyanate reactive group' in connection with the invention is meant a functional group that will react with an isocyanate group under typical reactive conditions for reacting an isocyanate group. Typical reactive conditions include reacting at a temperature of 20 to 150° C., for example 30 to 120° C. and typically involve the use of a catalyst. Generally, an isocyanate reactive group includes at least one Zerewittenoff hydrogen. Though not intended to be limiting, examples of isocyanate reactive groups include: alcohols, amines, thiols and carboxylic acids and derivatives thereof. Useful isocyanate reactive groups include for example —OH, —NH— or —NH$_2$ and —SH, —CO$_2$R$^3$, where R$^3$ is hydrogen or hydroxyalkyl, —C(O)N(R$^1$)(R$^2$), where R$^1$ and R$^2$ are independently hydrogen, hydroxyalkyl or polyalkylenepolyamine. Particularly useful isocyanate reactive groups include —OH, —NH— and —NH$_2$ groups.

Suitable polysiloxanes comprising an isocyanate reactive group can be linear or branched polydialkyl siloxanes, polyalkylaryl siloxanes or polydiarylsiloxanes wherein the isocyanate reactive group is situated at the end of the polymer chain, ie in the end group and/or in the terminal portion of side groups of the polysiloxane. In a preferred embodiment, the isocyanate reactive group is comprised in end groups of the polysiloxane chain. Representative examples of polysiloxanes of which the end groups comprise an isocyanate reactive group include polysiloxanes of the general formula:

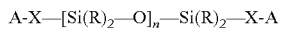

wherein A is an isocyanate reactive group, X is a divalent linking group, each R is independently an alkyl group of 1-4 carbon atoms or an aryl group and n is a value between 2 and 200.

Particular useful examples of polysiloxanes having an isocyanate reactive group at the end of the polysiloxane chain include hydroxyl terminated polydialkylsiloxanes of formula:

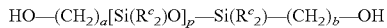

wherein a and b are independently 1, 2, 3 or 4, p represents a value of 5 to 200 and R$^c$ is an alkyl group of 1 to 4 carbon atoms, preferably R$^c$ represents a methyl group.

Further useful examples include amino-terminated polydialkylsiloxanes of formula:

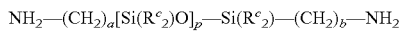

wherein a, b, p and R$^c$ are as defined above.

Polysiloxanes having isocyanate reactive end groups are commercially available and include for example IM11, IM15, IM22, IM47, FLUID NH 40D, FLUID NH 130D, FLUID OH 15D, FLUID OH 40D (all available from Wacker, Germany) and X-22 160AS, X-22-161, KF-6001 and KF-6002 (all available from Shin-Etsu, Japan).

The di-isocyanate may be an aliphatic, alicyclic or aromatic compound. Examples include e.g., isophorone diisocyanate (IPDI), hexamethylene diisocyanate, 2,2,4-trimethyl-1, 6-hexamethylene diisocyanate, dicyclohexylmethane-4,4'-diisocyanate; 4,4'-methylenediphenylene diisocyanate, 4,6-di-(trifluoromethyl)-1,3-benzene diisocyanate, 2,4-toluene diisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyl diisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate.

In addition to di-isocyanates, also tri- and polyisocyanates can be used. Useful examples include isocyanurates e.g., cyclic trimer of hexamethylenediisocyanate and cyclic trimer of isophorone diisocyanate, and biurets containing tri-isocyanates. Typically the amount (in equivalents) of tri- and polyisocyanate should not exceed 40% of the total equivalents of isocyanate used, more preferably it should not exceed 25%.

In one embodiment, the organic compound having (a) one or more —SiY groups wherein Y represents a hydrolysable group and (b) an isocyanate reactive group can be represented by the formula:

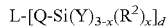

$$L\text{-}[Q\text{-}Si(Y)_{3-x}(R^2)_x]_d$$

wherein L represents an isocyanate reactive group. Q is an organic linking group, x is 0, 1 or 2 and d is 1 or 2. $R^2$ independently represents an alkyl group, preferably a C1-C8 alkyl group (such as methyl, ethyl, propyl and iso-octyl) or an C1-C8 alkyl group containing a cyclic hydrocarbon structure (such as cycloalkyl, e.g. cyclohexyl or cyclopentyl), an aryl group (preferably containing 6 to 20 carbon atoms which may optionally be substituted by one or more C1-C4 alkyl groups or halogens or mixtures thereof, such as phenyl), an alkylaryl group (preferably containing 7 to 12 carbon atoms) or an aralkyl group (preferably containing 7 to 12 carbon atoms).

The groups Y independently represent hydrolysable groups as defined above. Particular suitable examples of hydrolysable groups include alkoxy groups, such as methoxy, ethoxy, propoxy and butoxy groups, chlorine and an acetoxy group. Particularly preferred hydrolysable groups include methoxy and ethoxy groups.

The linking group Q is typically an alkylene group (preferably containing 1 to 10, more preferably containing 1 to 6 carbon atoms) optionally interrupted with nitrogen, oxygen or sulphur atoms, an arylene (preferably containing 6 to 20 carbon atoms which may be substituted by one or more C1-C4 alkyl groups, halogen atoms) or mixtures thereof.

In a particular preferred embodiment the organic compound having (a) one or more —SiY groups wherein Y represents a hydrolysable group and (b) an isocyanate reactive group can be represented by the formula II:

$$T[\text{-}(CH_2)_s\text{—}SiY_3]_h \quad (II)$$

wherein s is 1, 2, 3 or 4, h is 1 or 2, T represents an isocyanate reactive group and Y represents an alkoxy group, preferably a methoxy or ethoxy group.

Examples of compounds according to formula (II) include bis(3-trimethoxysilyl propyl)amine bis(3-triethoxysilyl propyl)amine, 3-aminopropyltrimethoxysilane and 3-aminopropyltriethoxysilane. A particularly preferred organic compound according to formula (II) is bis(3-trimethoxysilyl propyl)amine. The use of this compound leads to a polymer having multiple, for example more than 6, hydrolysable groups. It has been found that this might be especially advantageous for impairing compatibility of the hybrid condensate typically resulting in more clear final hardcoats.

In an alternative embodiment, the organic compound having (a) one or more —SiY groups wherein Y represents a hydrolysable group and (b) and isocyanate reactive group is obtainable by free radical reaction, for example free radical polymerization of an ethylenically unsaturated monomer having at least one —SiY group, in the presence of a chain transfer agent that comprises a mercapto group and an isocyanate reactive group. Suitable ethylenically unsaturated monomers include those that can be represented by the formula:

$$E\text{-}Z\text{—}Si(R^b)_xY_{3-x}$$

wherein E represents a free radical polymerizable group, Z represents an organic divalent linking group, each $R^b$ independently represents an alkyl group or an aryl group, each Y independently represents a hydrolysable group as defined above, x is 0, 1 or 2. Typical examples of hydrolysable groups include halogen, alkoxy, acyloxy, acyl or aryloxy groups.

The free radical polymerizable group E typically contains an ethylenically unsaturated group capable of undergoing a free radical polymerization. Suitable groups include, for example, moieties derived from vinyl ethers, vinyl esters, allyl esters, vinyl ketones, styrene, vinyl amide, acrylamides, maleates, fumarates, acrylates and methacrylates. Of these vinyl, acrylates and methacrylates are preferred.

The organic divalent linking group Z preferably contains from 1 to about 20 carbon atoms. Z can optionally contain oxygen, nitrogen, or sulfur-containing groups or a combination thereof. Z is preferably free of functional groups that substantially interfere with free-radical oligomerization (e.g., polymerizable olefinic double bonds, thiols, and other such functionality known to those skilled in the art). Examples of suitable linking groups Z include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof. Preferred linking groups are selected from the group consisting of alkylene, oxyalkylene and carbonyloxyalkylene.

In a particular embodiment, the ethylenically unsaturated monomer corresponds to the formula (III):

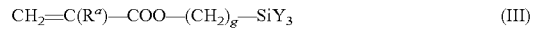

$$CH_2=C(R^a)\text{—}COO\text{—}(CH_2)_g\text{—}SiY_3 \quad (III)$$

wherein g is 1, 2, 3 or 4, Y is an alkoxy group, such as methoxy and ethoxy and $R^a$ represents H or $CH_3$. Suitable example includes gamma-(meth)acryloxypropyltrimethoxysilane and gamma-(meth)acryloxypropyltriethoxysilane.

The organic compound can conveniently be prepared through a free radical polymerization of an ethylenically unsaturated monomer having at least one SiY group, in the presence of a chain transfer agent that comprises a mercapto group and an isocyanate reactive group different from a mercapto group. Typical chain transfer agents useful in the free radical reaction include those selected from 2-mercaptoethanol, 3-mercapto-2-butanol, 4-mercapto-1-butanol, 3-mercapto-2-propanol, 3-mercapto-1-propanol, 3 mercapto 1,2 propanediol, and 2-mercapto-ethylamine.

In a particular embodiment, chain transfer agents include those that correspond to the formula:

$$HS\text{—}(CH_2)_f\text{—}OH$$

wherein f is 2, 3 or 4, and up to 11.

A particular chain transfer agent is 2-mercapto ethanol.

A single chain transfer agent or a mixture of different chain transfer agents may be used. A chain transfer agent is typically present in an amount sufficient to control the number of polymerized monomer units and to obtain the desired molecular weight of the compound.

The chain transfer agent is generally used in an amount of about 0.05 to about 0.5 equivalents, preferably about 0.10 to 0.25 equivalents, per equivalent of monomer.

A free radical initiator is generally used to initiate the polymerization reaction. Commonly known free-radical initiators can be used and examples thereof include azo compounds, such as azobisisobutyronitrile (ABIN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The reaction can be carried out in any solvent free of Zerewittenoff hydrogens suitable for organic free-radical polymerizations. The monomer can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), ketones (e.g., acetone, methylethyl ketone, methyl isobutyl ketone) and mixtures thereof.

The reaction can be carried out at any temperature suitable for conducting an organic free-radical polymerization. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 200° C.

The polymer comprising a polysiloxane segment and having at least one —SiY functional group can be prepared in a one step condensation process. In an alternative embodiment, the polymer can be prepared in a two step condensation process. In a first step, the polysiloxane of which the end groups comprise an isocyanate reactive group and a di-isocyanate are subjected to a first condensation reaction. The di-isocyanate is added such that there is at least a two fold excess of isocyanate equivalents. In a second step, the organic compound having (a) at least one —SiY group and (b) at least one isocyanate reactive group is added to the reaction mixture and condensation reaction is maintained until all isocyanate groups have reacted. It will be appreciated by one skilled in the art that these condensation reactions result in a mixture of polymers.

The condensation reactions can be carried out under conventional conditions well-known to those skilled in the art. Preferably the reaction is run in the presence of a catalyst. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 to 10 percent, preferably about 0.01 to 5 percent, by weight based on the total weight of the reactants.

The condensation reactions are preferably carried out under dry conditions in a polar solvent such as ethyl acetate, acetone, methyl ethyl ketone, methyl isobutyl ketone, and the like.

Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 120° C.

In yet another embodiment of the invention, the polymer comprises one or more reaction products of a free radical reaction of an ethylenically unsaturated monomer having at least one —SiY group in the presence of a polysiloxane having two or more mercapto groups.

The ethylenically unsaturated monomer having at least one —SiY group is as defined above. In a preferred embodiment, the ethylenically unsaturated monomer corresponds to formula (III). Particularly preferred examples of the ethylenically unsaturated monomer include gamma-(meth)acryloxypropyltrimethoxysilane and gamma-(meth)acryloxypropyltriethoxysilane.

In a further preferred embodiment, the ethylenically unsaturated monomer is a vinyl monomer. Suitable examples include vinyl trimethoxysilane or vinyl triethoxysilane.

In addition to the ethylenically unsaturated monomer having at least one —SiY group as defined above, a fluorinated monomer may be used.

In one embodiment the fluorinated monomer can be represented by the formula:

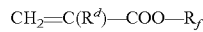

$CH_2=C(R^d)—COO—R_f$ wherein $R_f$ represents a perfluorinated polyether group and $R^d$ represents H or $CH_3$.

In a particular embodiment the perfluorinated polyether group corresponds to the general formula:

$CF_3CF_2CF_2O[CF(CF_3)CF_2O]_kCF(CF_3)—$ wherein k has a value of at least 1.

Perfluorinated polyether groups of the above formula can conveniently be prepared from the polymerization of hexafluoropropyleneoxide. In a particular embodiment, k is an integer of 3 to 25 and the corresponding perfluorinated polyether group has a molecular weight of at least 750 g/mol. Thus, in a particular embodiment of the invention, the fluorinated monomer corresponds to the formula:

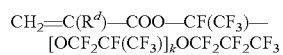

$CH_2=C(R^d)—COO—CF(CF_3)—$
$[OCF_2CF(CF_3)]_kOCF_2CF_2CF_3$ wherein $R^d$ represents H or $CH_3$ and k represents a value of at least 1, preferably at least 3. When used, the fluorinated monomer is typically added in an amount up to 25% (by equivalent) of the ethylenically unsaturated monomer having at least one —SiY group.

The polysiloxane having two or more mercapto groups can be linear or branched and can have the mercapto groups at the end of the polymer chain or in the side chains. The polysiloxane is preferably a polydialkylsiloxane.

In one embodiment the polysiloxane is an α,ω mercapto terminated polydialkylsiloxane that corresponds to the formula:

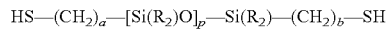

$HS—(CH_2)_a—[Si(R_2)O]_p—Si(R_2)—(CH_2)_b—SH$ wherein a and b are independently 1, 2, 3 or 4, p represents a value of 5 to 200 and R is an alkyl group of 1 to 4 carbon atoms.

Polydialkylsiloxanes according to the formula above are commercially available and include for example X-22-167B (available from Shin-Etsu, Japan).

In an alternative embodiment the polysiloxane has mercapto groups in the side chain, optionally in combination with mercapto groups at the end of the polymer chain. Suitable examples can be represented by the formula:

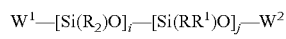

$W^1—[Si(R_2)O]_i—[Si(RR^1)O]_j—W^2$ wherein i has a value between 5 and 150 and wherein j has a value between 2 and 50 and the bracketed groups may be randomly distributed throughout the compound; R represents an alkyl group of 1 to 4 carbon atoms, $R^1$ represents —B—SH wherein B is selected from C1-C10 alkylene and aralkylene having at least 10 carbons and $W^1$ and $W^2$ represent an end group that may optionally contain a mercapto group. Preferably $W^1$ and $W^2$ are methyl groups.

Examples of polydialkylsiloxanes according to the formula above are commercially available and include for example KF-2001 (available from Shin-Etsu, Japan).

The reaction of the ethylenically unsaturated monomer having at least one —SiY group and the optional fluorinated monomer, in the presence of a polysiloxane having two or more mercapto groups can be carried out in the presence of a free radical initiator. Commonly known free-radical initiators can be used and examples thereof include azo compounds, such as azobisisobutyronitrile (ABIN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The reaction can be carried out in any solvent free of Zerewittenoff hydrogens and suitable for organic free-radical reactions. The monomers can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), ketones (e.g., acetone, methylethyl ketone, methyl isobutyl ketone) and mixtures thereof.

The reaction can be carried out at any temperature suitable for conducting an organic free-radical reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 200° C.

The ratio of polysiloxane having two or more mercapto groups to ethylenically unsaturated monomer having at least one —SiY group and optional fluorinated monomer is typically chosen to control the molecular weight of the polymer. The polysiloxane is generally used in an amount of 0.05 to 1 equivalents, preferably 0.1 to 0.25 equivalents, per equivalent of monomer.

In a further alternative embodiment the polymer useful in the method of treatment of the present invention has a segment that is fluorinated. The fluorinated segment can be perfluorinated (i.e. all C—H bonds are replaced by C—F bonds) or it can be partially fluorinated.

The polymer having a segment that is fluorinated and having at least one —SiY group comprised in end groups of the polymer and/or side groups of said polymer can for example be the reaction product of (i) a fluorinated polyether of the formula:

(T''-Q'')$_y$-R$_f$-Q'-T'    (IV)

wherein R$_f$ is a monovalent or divalent polyfluoropolyether group; Q' and Q'' are independently a divalent linking group, T'' and T' are —NCO or an isocyanate reactive group and y is 0 or 1,
with
(ii) a silane compound of the formula:

T'''Q'''-Si(Y$_{3-x}$)R$^3_x$    (V)

wherein each T''' is independently selected from the group consisting of —NCO and isocyanate reactive groups; Q''' is an organic divalent linking group and R$^3$ is an alkyl group or an aryl group; Y is a hydrolysable group and x is 0, 1 or 2, and wherein at least one of T', T'' or T''' is NCO.

The monovalent or divalent polyfluoropolyether group R$_f$ can include linear, branched, and/or cyclic structures, that may be saturated or unsaturated, and may contain one or more catenary oxygen atoms (i.e. one or more non-adjacent —CF$_2$— groups may be replaced by —O—). R$_f$ preferably is a perfluorinated group and includes repeating units selected from the group of —(C$_n$F$_{2n}$O)—, —(CF(Z)O)—, —(CF(Z)C$_n$F$_{2n}$O)—, —(C$_n$F$_{2n}$CF(Z)O)—, —(CF$_2$CF(Z)O)—, and combinations thereof, wherein the repeating units generally may be random, blocked or alternating arranged, and optionally can include —(C$_n$F$_{2n}$)— and —(CF(Z))— units and wherein n in a number from 1 to 12 inclusive, preferably from 1 to 4 inclusive.

In these repeating units Z is a perfluoroalkyl group, an oxygen-containing perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms.

In a particular embodiment, the polymer comprises a backbone segment that is fluorinated. In a further particular embodiment, Rf is a divalent perfluoropolyether group. Typical approximate average structures for a divalent perfluoropolyether group include —CF$_2$O(CF$_2$O)$_m$(C$_2$F$_4$O)$_p$CF$_2$—, wherein an average value for m and p is 0 to 50, with the proviso that m and p are not simultaneously 0, —CF(CF$_3$)O(CF(CF$_3$)CF$_2$O)$_p$CF(CF$_3$)—, —CF$_2$O(C$_2$F$_4$O)$_p$CF$_2$—, and —(CF$_2$)$_3$O(C$_4$F$_8$O)$_p$(CF$_2$)$_3$—, wherein an average value for p is 3 to 50. Of these, particularly preferred approximate average structures are —CF$_2$O(CF$_2$O)$_m$(C$_2$F$_4$O)$_p$CF$_2$—, —CF$_2$O(C$_2$F$_4$O)$_p$CF$_2$—, and —CF(CF$_3$)(OCF$_2$(CF$_3$)CF)$_p$O(CF$_2$)$_m$O(CF(CF$_3$)CF$_2$O)$_p$CF(CF$_3$)—.

The values of m and p in these approximate average structures can vary. Preferably, an average value of m is within a range of about 1 to about 50, and an average value of p is within a range of about 3 to about 40. As these are polymeric materials, such compounds exist as mixtures upon synthesis, which are suitable for use. The repeat units generally may be positioned in a random, blocked or alternating arrangement.

Compounds of formula IV suitably have an average molecular weight (weight average) of at least about 200, and preferably, at least about 800. Preferably, they are no greater than about 10000.

Examples of linking groups Q' and Q'' include organic groups that comprise aromatic or aliphatic groups that may be interrupted by O, N or S and that may be substituted, alkylene groups, oxy groups, thio groups and/or carbonyl groups.

T', T'' or T''' represent isocyanate or an isocyanate reactive group. In accordance with a particular embodiment, the moiety -T' and/or -T'' is a moiety of the formula —CO—N(R$^1$)(R$^2$) where R$^1$ is for example —CH$_2$CH$_2$OH, —CH$_2$CH$_2$NHCH$_2$CH$_2$NH$_2$ or —CH$_2$CH$_2$NHCH$_2$CH$_2$NHCH$_2$CH$_2$NH$_2$; and R$^2$ is for example hydrogen or R$^1$.

Compounds having the moiety —CO—N(R$^1$)(R$^2$) listed above can be obtained by reacting the methyl ester derivative of a fluorinated polyether with an amino-alcohol. For example 2-aminoethanol would yield a compound having the moiety —CONHCH$_2$CH$_2$OH. In the same manner, the methyl ester of a fluorinated polyether may be reacted with diethylene triamine or triethylene tetramine to form moieties —CONHCH$_2$CH$_2$NHCH$_2$CH$_2$NH$_2$ and —CONHCH$_2$CH$_2$NHCH$_2$CH$_2$NH—CH$_2$CH$_2$NH$_2$ respectively.

In formula (V), T''' is a group as defined for T' or T'' above. In one embodiment T''' includes at least one —NCO group. When T''' is not NCO, then T' or T'' includes at least one —NCO group.

The divalent linking group Q''' in the above formula (V) can include linear, branched, or cyclic structures, that may be saturated or unsaturated. The group Q''' can contain one or more heteroatoms (e.g., oxygen, nitrogen, or sulfur) or functional groups (e.g., carbonyl, amido, urethanylene or sulfonamido). Preferably, the divalent linking group Q''' is a hydrocarbon group, preferably, a linear hydrocarbon group, optionally containing heteroatoms or functional groups. Examples of Q''' groups include —CH$_2$O(CH$_2$)$_3$—, —CH$_2$OC(O)N(R)(CH$_2$)$_3$—, wherein R is H or lower alkyl group, —(C$_n$H$_{2n}$)—N(H)—C(O)O— and —(C$_n$H$_{2n}$)—, wherein n is about 2 to about 6. A preferred linking group Q''' is —CH$_2$CH$_2$CH$_2$—.

Particularly suitable examples of compounds of formula V include 3-isocyanato propyl triethoxysilane and 3-isocyanato propyl trimethoxysilane.

Polymers comprising a fluorinated segment and having at least one —SiY functional group wherein Y represents a hydrolysable group and wherein said —SiY group is comprised in end groups of the polymer and/or side groups of said polymer are described in and can conveniently be prepared according to WO 2005026236.

In yet a further embodiment of the present invention the polymer used in the treatment method further comprises one or more segments of a polyoxyalkylene in which the oxyalkylene units have from 1 to 4 carbon atoms.

Examples of such units include —OCH$_2$—CH$_2$—, —OCH$_2$—CH$_2$—CH$_2$—, —OCH(CH$_3$)CH$_2$—, and —OCH (CH$_3$)CH(CH$_3$)—. The oxyalkylene units can be the same, as in poly(oxyethylene), or present as a mixture, as in a heteric straight or branched chain or a chain of randomly distributed oxyethylene and oxypropylene units, or as in a straight or branched chain of blocks of oxyethylene units and blocks of oxypropylene units. Preferably, the number of oxyalkylene units in the poly(oxyalkylene) segment is between 2 and 100, more preferably between 5 and 100.

The treatment composition used in the present invention further comprises at least one hydrolysable silane corresponding to the formula (I) or hydrolysates or condensates thereof:

$$Q_n SiG_{4-n} \quad (I)$$

wherein Q represents a hydrocarbon group that can optionally be substituted, G represents a hydrolysable group and n is 0, 1 or 2

The hydrolysable groups G present in component (b) may be the same or different and are generally capable of hydrolyzing under appropriate conditions, for example in wet or humid conditions, optionally in the presence of a condensation catalyst, such that component (b) can undergo condensation reactions. Preferably, the hydrolysable groups upon hydrolysis yield groups capable of undergoing condensation reactions, such as hydroxyl groups.

Suitable examples of hydrolysable groups include those as described with respect to hydrolysable groups Y of polymer (a). Particularly suitable hydrolysable groups include alkoxy groups, aryloxy groups, acyloxy groups and halogens.

In a preferred embodiment, the hydrolysable silane (b) includes tetra-, tri- or dialkoxy (preferably containing 1 to 4 carbon atoms) compounds.

The hydrocarbon groups Q may be the same or different and are generally not capable of hydrolyzing under the conditions listed above. For example, the hydrocarbon groups Q may be independently selected from an aliphatic hydrocarbon group, for example a C1-C30 alkyl group, which may be a straight chain or may be branched and may include one or more cyclic hydrocarbon structures, a C6-C30 aryl group (optionally substituted by one or more substituents selected from halogens and C1-C4 alkyl groups), or a C7-C30 aralkyl group.

Representative examples of hydrolysable silane (b) according to formula (I) include tetra methoxysilane, tetra ethoxysilane, methyl triethoxysilane, dimethyldiethoxysilane, octadecyltriethoxysilane, and methyl trichlorosilane.

Particularly suitable are tetra ethoxysilane, methyl triethoxysilane and dimethyldiethoxysilane, the hydrolysates and condensates thereof. Single compounds or mixtures of compounds (b) or the hydrolysates and condensates thereof may be used. By 'condensates' is meant that some of the hydrolysable groups of the hydrolysable silane have reacted to form a condensation product of the hydrolysable silane compound, while leaving a substantial amount of hydrolysable groups available for a further condensation reaction. The condensation reaction may occur in the presence of water and/or a catalyst. Particularly at least 20%, preferably at least 30%, more preferably at least 50% of the hydrolysable groups are still available for condensation reaction.

In addition, the treatment composition according to the present invention may comprise condensates of the polymer (a) and the hydrolysable silane (b) or its hydrolysates or condensates.

In order to prepare a treatment composition according to the present invention, a polymer comprising a polysiloxane segment or a segment that is fluorinated and having at least one —SiY functional group is combined in an organic solvent with at least one hydrolysable silane or hydrolysates or condensates thereof.

By the time a coating composition is applied to the substrate the polymer and the hydrolysable silane or hydrolysates or condensates thereof may have undergone a condensation reaction. Accordingly, the treatment composition may comprise condensation products of said polymer and said hydrolysable silane according to formula (I) or hydrolysates or condensates of said hydrolysable silane according to formula (I). Generally, the amount of condensation that takes place prior to coating will depend on the concentration and nature of polymer (a) and the hydrolysable silane (b) or hydrolysates or condensates thereof, the temperature and the time between preparation of the coating composition and the coating of the substrate.

The composition used in the treatment method according to the invention may additionally comprise a compound ? having at least one —Si-G$^1$ functional group wherein G$^1$ represents a hydrolysable group and wherein the compound does not contain polysiloxane segments or segments that are fluorinated.

In one embodiment the compound or the polymer can be represented by the formula:

$$G^1{}_{4-n}R^6{}_nSi—R^5—SiR^6{}_nG^1{}_{4-n} \quad (VI)$$

wherein R$^5$ represents a difunctional organic linking group, optionally comprising a polymer segment that does not contain polysiloxane segments or fluorinated segments, R$^6$ represents a hydrocarbon group that can optionally be substituted, G represents a hydrolysable group as defined above and n is 0, 1 or 2.

Compounds according to formula (VI) can conveniently be prepared starting from a silane coupling agent and a hydrocarbon compound having reactive end groups. The silane coupling agent can be represented by the formula

$$P^1—SiR^7{}_nG^1{}_{4-n}$$

Wherein R$^7$ represents a hydrocarbon group that can optionally be substituted, G$^1$ represents a hydrolysable group and n is 0, 1 or 2.

P$^1$ represents an organic group containing at least one functional group selected from the group consisting of an epoxy group, an alcohol, a thiol, an amine or an isocyanato group. Representative examples of silane coupling agents include 3-aminopropyltrimethoxysilane, 3-aminopropyltriethoxysilane, 3-isocyanato propyl triethoxysilane, 3-isocyanato propyl trimethoxysilane, 3-mercaptopropyl triethoxy silane, glycidoxypropyl trimethoxysilane and glycidoxypropyltriethoxysilane.

Particularly preferred silane coupling agent includes 3-aminopropyltriethoxysilane, 3-aminopropyltrimethoxysilane, 3-iso cyanatopropyltriethoxysilane and 3-isocyanatopropyltrimethoxysilane.

The hydrocarbon compound preferably has at least two functional groups that can react with the functional group of the silane coupling agent. Examples of such functional groups typically include epoxy groups, amines and alcohols.

Of particular interest are bisphenol A derived epoxy derivatives, such as fully hydrogenated bisphenol A diglycidylether. Other examples include polyethyleneglycol diols with average weight molecular weight of 400 or 2000.

Further additional compounds include titanates, zirconates and aluminates having hydrolysable groups. Examples include tetra-methyl orthotitanate, tetra ethyl orthotitanate, tetra-iso-propyl orthotitanate, tetra-n-propyl orthotitanate, tetraethyl zirconate, tetra-iso-propyl zirconate, tetra-n-propyl zirconate, tri-isobutyl aluminate and the like.

The coating composition can contain further additives, such as wetting or spreading agents. These types of additives are often referred to a surfactants. Suitable surfactants typically include a non-polar groups, such as a polysiloxane or a fluoroalkyl group, and a polar, preferably non-ionic group. Examples polysiloxane non-ionic surfactants and fluorinated non-ionic surfactants. Of particular interest are trisiloxane non-ionic surfactant, hydroxyl endcapped and having ethylene oxide segments and/or propylene oxide segments. Further suitable examples include oligomeric polydimethylsiloxanes, hydroxyl endcapped and having pendant and/or alpha-omega ethylene oxide segments. Non-ionic polysiloxane surfactants useful in the composition of the invention are commercially available and include Silwet™ surfactants (available from Momentive Performance Materials).

The composition used in the method of the invention is dissolved or dispersed in an organic solvent. Suitable organic solvents, or mixtures of solvents can be selected from aliphatic alcohols (preferably containing 1 to 6 carbon atoms), such as methanol, ethanol, isopropylalcohol; ketones such as acetone or methyl ethyl ketone; esters, such as ethyl acetate, methylformate and ethers, such as diethyl ether. Particularly preferred solvents include ethanol, isopropanol and methyl ethyl ketone.

The coating composition will typically contain between 1% and 50% by weight of solids.

In general, the amount of polymer (a) and the condensation products (c) of said polymer and hydrolysable silane according to formula (I) or hydrolysates or condensates of said hydrolysable silane according to the formula (I) to the total amount of solids is at least 1%, preferably at least 5% and up to 30% by weight.

In order to advance full curing of the treatment compositions, water is preferably added to the composition. Typically, the amount of water will be between 0.1 and 20% by weight of the total composition, more preferably between 0.1 and 10% by weight. In addition to water, an organic or inorganic acid or base catalyst should preferably be added to the coating composition. In an alternative embodiment, the catalyst can separately be applied to the surface of the wheel rim for example as part of a primer coating or by spraying a catalyst composition on the wheel rim before or after application of the coating composition according to the invention.

Organic acid catalysts include acetic acid, citric acid, formic acid, triflic acid, perfluorobutyric acid and the like. Examples of inorganic acids include sulphuric acid, hydrochloric acid and the like. Examples of useful base catalysts include sodium hydroxide, potassium hydroxide and triethylamine. Organometallic catalysts can also be used. Examples include dibutyltindilaurate and tin di(2-ethylhexanoate).

The catalyst will generally be used in amounts between 0.01 and 10%, more preferably between 0.05 and 5% by weight of the total composition.

The composition containing polymer (a), hydrolysable silane (b) or hydrolysates or condensates thereof and polycondensates (c) is generally applied to at least a portion of the surface of a wheel rim.

Wheel rims, in particular high performance wheel rims are typically made of aluminum. To give an improved appearance and enhanced weather resistance, the aluminum wheel rims are coated with several organic coatings, typically transparent or colored thermosetting acrylic resin powder coating compositions.

The treatment composition can be applied directly onto the organic thermoset coating of the wheel rim. In an alternative embodiment, a primer can first be coated on the organic thermoset coating, in order to improve adhesion of the treatment composition. Suitable primers include primers for paints and coatings as is known in the art. Suitable commercially available examples include AP111 and 3M™ Adhesion Promotor 4298 (available from 3M), SHP 401 (available from Momentive) and Keim Silan Primer (alkoxyalkyl silane, available from Keim Paints). After drying and optional curing the treatment composition can then be applied onto the primer.

The treatment composition is typically applied in amounts sufficient to produce a coating that provides dirt repellent and easy-clean properties. Typical the coating thickness after drying and curing is between 0.1 and 50µ, preferably between 1 and 10µ.

Treatment of at least a portion of the wheel rims generally results in rendering the treated surfaces less retentive of soil and more readily cleanable due to the oil and water repellent nature of the treatment composition. These desirable properties are typically maintained despite extended exposure or use and repeated cleanings because of the generally high degree of durability of the treated surface as can be obtained with the method.

In accordance with a particular embodiment, compositions for application to a substrate are prepared by blending the polymer comprising a polysiloxane segment and/or a fluorinated segment with the at least one hydrolysable silane according to formula (I) or hydrolysates or condensates thereof and further optional additives in a solvent or solvent mixture. Water and catalyst are optionally added and the mixture is allowed to undergo further hydrolysis and/or condensation for about 30 minutes to 48 hours before applying the mixture to the wheel rim.

A wide variety of coating methods can be used to apply the coating composition. Suitable methods of application include brushing, spraying, dipping, rolling, spreading, and the like. A preferred coating method for application of the coating composition includes spray application.

A substrate to be coated can typically be contacted with the treating composition at room temperature (typically, about 15 C to about 30 C). Following application, the treated substrate can be dried and cured preferably at elevated temperature, e.g. at 40 to 300° C. and for a time sufficient to dry and cure e.g. from 10 minutes to 1 hour.

EXAMPLES

The following examples further illustrate the invention without the intention however to limit the invention thereto. All parts are by weight unless indicated otherwise.

| ABBREVIATIONS | | |
|---|---|---|
| Abbreviation | Product | Availability |
| IPDI | Isophorone diisocyanate | Aldrich |
| Bisilane | Bis-(trimethoxysilylpropyl)amine | Aldrich |
| PDMS-1 | KF-6002: α,ω polydimethylsiloxane diol with about 43 SiO repeating units (MW 3200) | Shin-Etsu |
| PDMS-2 | Wacker IM-11: α,ω polydimethylsiloxane diol with OH value 110 | Wacker |
| PDMS-3 | X-22-160AS: α,ωPolydimethylsiloxane diol with about 13 SiO repeating units (OH equivalent 500) | Shin-Etsu |
| PDMS-4 | KF-2001: α,ω mercapto terminated polydimethylsiloxane | Shin-Etsu |
| PDMS-5 | X-22-167B: α,ω mercapto terminated polydimethylsiloxane (OH equivalent weight: 1670) | Shin-Etsu |
| TETA | Triethylenetetramine $NH_2CH_2CH_2NHCH_2CH_2NHCH_2CH_2NH_2$ | Sigma-Aldrich |
| NCO-silane | 3-(triethoxysilyl)propyl isocyanate | Sigma-Aldrich |
| Fomblin Z-Deal ™ | Perfluoropolyether ester | Ausimont |
| $HFPO_{7.5}$-MA | Hexafluoropropylene oxide methacrylate with average of 7.5 HFPO units | Made according to U.S. Pat. No. 7,094,829 col 17, lines 1-22 |
| TEOS | Tetraethyl orthosilicate; $Si(OC_2H_5)_4$ | Sigma-Aldrich |
| MTEOS | Methyltriethoxy silane; $CH_3Si(OC_2H_5)_3$ | Sigma-Aldrich |
| DDS | Dimethoxy dimethyl silane: $(CH_3)_2Si(OCH_3)_2$ | |
| APTES | 3-Aminopropyltriethoxysilane | Sigma-Aldrich |
| MAPTMES | Methacryloyloxypropyltrimethoxysilane, | Sigma-Aldrich |
| MPEG-750A | Methoxypolyethyleneglycol acrylate having a Mw of 750 | 3M |
| IPTES | 3-Isocyanatopropyl triethoxysilane | Sigma-Aldrich |
| VTMS | Vinyl trimethoxy silane | Sigma-Aldrich |
| MEK | 2-butanone | Sigma-Aldrich |
| CW-1000 | polyethyleneglycol of average MW of about 1000 | Sigma-Aldrich |
| CW-400 | polyethyleneglycol of average MW of about 400 | Sigma-Aldrich |
| CW-2000 | polyethyleneglycol of average MW of about 2000 | Sigma-Aldrich |
| SIL-1 | Worlée Protect 1507 (42% solids in ethanol and propyleneglycol methyletheracetate, containing trace amounts of water) | Worlée-Chemie GmbH, Germany |
| SIL-2 | PHC587: 20% solids in 2-propanol, butanol and methanol containing 8% water and 0.4% acetic acid | Momentive Performance Chemicals Inc |
| SIL-3 | APTES/hydrogenated bisphenol A diglycidylether | Synthesis as given below |
| DDS | Dimethoxy dimethyl silane | Sigma-Aldrich |
| SURF-1 | Silwet ™ L-7280 Trisiloxane non-ionic surfactant with EO/PO 60/40, hydroxy endcapped; average weight Mw: 600 | Momentive Performance Materials |
| SURF-2 | Silwet ™ L-7608 Trisiloxane non-ionic surfactant with only EO groups, hydroxy endcapped; average weight Mw: 600 | Momentive Performance Materials |
| SURF-3 | Silwet ™ L-7650 Oligomeric non-ionic polydimehtylsiloxane with pendant EO segments, hydroxy endcapped; average weight Mw: 6000 | Momentive Performance Materials |
| SURF-4 | Silwet ™ L-8620 Oligomeric non-ionic linear PDMS with alpha-omega EO units, hydroxyl endcapped; average weight Mw: 2000 | Momentive Performance Materials |

Synthesis of Materials Used

A. Synthesis of Compound 1A (MAPTMES/Mercaptoethanol 4/1): Method a)

A 250 ml polymerization bottle was charged with 49.6 g MAPTMES (0.2 eq.), 53.5 g MEK, 3.90 g 2-mercapto-ethanol (0.05 eq.) and 0.16 g V-59 initiator. The bottle was degassed 4 times using waterjet vacuum, followed by purging with nitrogen atmosphere. The polymerization bottle was sealed and run for 8 hours at 80° C. in a pre-heated Launder-o-meter. After cooling the reaction bottle was opened and charged again with 0.16 g V-59 initiator. The bottle was again degassed and purged with nitrogen and run for another 6 hours at 85° C. A $3^{rd}$ initiator charge was then added followed by reacting 16 hours at 85° C.

A solution of MAPTMES/mercaptoethanol 4/1 at 50% solids in MEK was obtained.

B. Synthesis of Compound 1B (MAPTMES/Mercaptoethanol 4/1): Method b)

A 250 ml polymerization bottle is charged with 90.2 g MAPTMES (0.364 eq.), 97.3 g MEK, 7.09 g 2-mercaptoethanol (0.091 eq.) and 0.29 g V-59 initiator. The bottle is degassed 4 times using waterjet vacuum, followed by purging with nitrogen atmosphere. The polymerization bottle is sealed and run for 16 hours at 75° C. in a pre-heated Launder-o-meter. After cooling the reaction bottle is opened and charged again with 0.29 g V-59 initiator. The bottle is again degassed and purged with nitrogen and run for another 6 hours at 75° C. Completion of the reaction is confirmed by C-13 NMR.

A solution of MAPTMES/mercaptoethanol 4/1 at 50% solids in MEK was obtained.

C. Synthesis of Polymers Having at Least One Hydrolysable Silane Group (PHSIL)

PHSIL-1: IPDI/PDMS-2/Compound 1A (Mol Ratio: 2/1/2)

A polymer with hydrolysable silane groups PHSIL-1 was made in a one step reaction:

A 100 ml reaction bottle was charged with 10.34 g compound 1 a), 1.07 g isophorone diisocyanate (IPDI; 0.01 eq.), 2.71 g PDMS-2 (0.005 eq.), 8 g MEK and 1 drop of dibutyl tin dilaurate (DBTDL). The reaction was run for 16 hours at 75° C. after which all isocyanate has been consumed according to FT-IR.

A yellow, clear non-viscous liquid was obtained having a solids content of 40%.

PHSIL-2: IPDI/PDMS-1/Compound 1B (Mol Ratio: 2/1/2)

PHSIL-2 was made in a two step reaction:

A 500 ml 3-neck reaction flask is fitted with a mechanical stirrer, heating mantle, Dean-Stark condenser, thermometer and nitrogen inlet. The vessel was charged with 80.0 g PDMS-1 (0.05 eq.) and 213.4 g MEK, followed by stripping of 50 gram solvent azeotropically. After cooling the reaction mixture to 40° C., 11.1 g isophorone diisocyanate (IPDI; 0.1 eq.) and 0.072 g dibutyl tin dilaurate (DBTDL) were added subsequently. After running the reaction for 3 hours at 80° C., the temperature was lowered to 40° C. and 117.7 g compound 1b was added. The reaction was then continued for 6 hours at 80° C. After cooling to 40° C. 21.40 g compound 1b was added, followed by reacting 16 hours at 75° C. The reaction was cooled to 40° C. and 1 g methanol was added to neutralize the residual isocyanate.

A yellow, clear non-viscous liquid (40% solids) was obtained.

PHSIL-3: IPDI/PDMS-1/Bisilane (Molar Ratio 2/1/2)

In a three necked flask of 500 ml, fitted with a stirrer, thermometer, condenser and heating mantle, were placed 17.8 g (0.08 moles) IPDI, 20 g (0.04 moles) PDMS-1 and 58 g dry MEK and 0.05 g stannous octanoate catalyst (available from Aldrich). The reaction mixture was heated up to 80° C. under nitrogen and reacted for 6 hours. The mixture was cooled to about 30° C. under nitrogen and 13.6 g (0.04 moles) bisilane were added. The reaction was continued at 60° C. for 16 hours under nitrogen atmosphere. IR-analysis indicated no residual isocyanate. The reaction mixture was cooled to room temperature.

PHSIL-4 to PHSIL-8

Polymers PHSIL-4 to PHSIL-8 were prepared according to the procedure outlined for PHSIL-3. The composition of the polymers is given in table 1:

| Polymer | Isocyanate compound | Hydrophilic compound | PDMS | Additional compound | Molar ratio |
|---|---|---|---|---|---|
| PHSIL-4 | IPDI | CW1000 | PDMS-3 | bisilane | 4/1/2/2 |
| PHSIL-5 | IPDI | CW1000 | PDMS-3 | APTES | 4/1/2/2 |

-continued

| Polymer | Isocyanate compound | Hydrophilic compound | PDMS | Additional compound | Molar ratio |
|---|---|---|---|---|---|
| PHSIL-6 | IPDI | CW400 | PDMS-3 | APTES | 4/1/2/2 |
| PHSIL-7 | IPDI | CW2000 | PDMS-3 | APTES | 4/1/2/2 |
| PHSIL-8 | IPDI | / | PDMS-3 | Bisilane | 2/1/2 |

PHSIL-9: Z-DEAL™/TETA/NCO (Molar Ratio 1/2/6)

PHSIL-9 was made according to example 2 of WO 2005/026236.

PHSIL-10: PDMS-4/MAPTMES 1/4

A 100 ml polymerization bottle was charged with 19.0 g PDMS-4 (0.01 eq.), 9.92 g MAPTMES (0.04 eq.), 29 g MEK and 0.087 g V-59 initiator. The bottle was degassed 4 times using waterjet vacuum, followed by purging with nitrogen atmosphere. The polymerization bottle was sealed and run for 16 hours at 75° C. in a pre-heated Launder-o-meter. After cooling the reaction bottle was opened and charged again with 0.087 g V-59 initiator. The bottle was again degassed and purged with nitrogen and run for another 6 hours at 75° C.

A clear, non-viscous colourless solution (50% solids) was obtained.

PHSIL-11 PDMS-5/MAPTMES 1/4Polymer PHSIL-11 was made according to the same procedure as given for PHSIL-10, but using PDMS-5 instead of PDMS-4. A 50% solids polymer composition of PDMS-6/MAPTMES 1/4 (eq ratio) in MEK was obtained.

PHSIL-12 PDMS-4/VTMS 1/1

A 100 ml polymerization bottle was charged with 22.8 g PFMS-5 (0.01 eq.), 1.78 g VTMS (0.01 eq.), 25 g MEK and 0.087 g V-59 initiator. The bottle was degassed 4 times using waterjet vacuum, followed by purging with nitrogen atmosphere. The polymerization bottle was sealed and run for 16 hours at 75° C. in a pre-heated Launder-o-meter. After cooling the reaction bottle was opened and charged again with 0.087 g V-59 initiator. The bottle was again degassed and purged with nitrogen and run for another 6 hours at 75° C.

A clear, non-viscous colourless solution (50% solids) was obtained.

PHSIL-13 PDMS-5/VTMS 1/1

Polymer PHSIL-13 was made according to the same procedure as given for PHSIL-12, but using PDMS-5 instead of PDMS-4. A 50% solids polymer composition of PDMS-5/VTMS 1/1 (eq ratio) in MEK was obtained.

PHSIL-14: PDMS-4/MAPTMES/HFPO-MA/MPEG750A Equivalent Ratio 1/4/1/1

A 100 ml polymerization bottle was charged with 11.40 g PDMS-4 (0.01 eq.), 5.95 g MAPTMES (0.04 eq.), 7.95 g HFPO-MA (0.01 eq.), 4.50 g MPEG750A, 30 g MEK and 0.087 g V-59 initiator. The bottle was degassed 4 times using water jet vacuum, followed by purging with nitrogen atmosphere. The polymerization bottle was sealed and run for 16 hours at 75° C. in a pre-heated Launder-o-meter. After cooling the reaction bottle was opened and charged again with 0.087 g V-59 initiator. The bottle was again degassed and purged with nitrogen and run for another 6 hours at 75° C.

A yellowish hazy solution (50% solids) was obtained.

PHSIL-15 and PHSIL-16

Polymers PHSIL-15 and PHSIL-16 were prepared according to the procedure outlined for PHSIL-14. The composition of the polymers is given in the table below:

| PHSIL | Reagent 1 | Reagent 2 | Reagent 3 | Equivalent ratio |
|---|---|---|---|---|
| PHSIL-15 | PDMS-4 | MAPTMES | HFPO-MA | 1/4/1 |
| PHSIL-16 | PDMS-5 | MAPTMES | HFPO-MA | 1/4/1 |

D. Synthesis of Hydrolysable Silane Compound (SIL-3)

In a three necked reaction flask of 500 ml, fitted with a stirrer, thermometer, dropping funnel, condenser and heating mantle were placed 69.6 g (0.315 moles) APTES and 62.4 g dry isopropanol. The reaction mixture was stirred vigorously while 52.8 g (0.150 moles) Eponex Resin 1510 (fully hydrogenated bisphenol A diglycidylether, available from Hexion Specialty Chemicals Inc), dissolved in 60.0 g dry isopropanol were added through a dropping funnel during a period of 1 h, at room temperature. The reaction mixture was kept under nitrogen for an additional 1 hour. Subsequently the reaction mixture was heated up to 60° C. for 2 hours and then cooled down to room temperature. IR-analysis indicated no residual epoxide groups.

Methods of Application and Testing

Coating Procedure

The described materials were coated on acrylic powder coated aluminum panels (available from BBS, Germany) by use of a bar coater, depositing a 25μ liquid coating thickness. The treated samples were allowed to dry at room temperature for 10 minutes and then cured at 130° C. for 30 minutes. After curing the treated test panels were conditioned at RT. The samples were tested 24 hours after coating.

Respective data of tests shown in the following Examples and Comparative Examples are based on the following methods of measurement and evaluation criteria:

Bitumen Test

A solution of 0.3 g standard Bitumen 5070 (available from Dortmunder Gussasphalt GmbH, Germany) in 1.5 ml heptane was prepared. Three times 1 drop of bitumen solution was put on the coated substrates with a pipette. The drops were allowed to dry for 24 hours at room temperature. The stains were then removed by a paper wipe. The results of the bitumen test ranged from −1 (worse than untreated sample), 0 (equal to untreated, stain can not be removed), 1 (minor part of the stain can be removed), 2 (most of the stain can be removed) to 3 (all of the stain can be removed).

Soiling Test 1

In a first step, aluminum test panels (8×18 cm) were fixed with double sided transfer tape onto the inner side of a 17 inch rim. Nine plates could be attached per rim. The Bingen Brake Dust test procedure (University Bingen) was done using following brake test standards, running subsequently after each other:

Grossglockner Touristenabfart (16 min)

Grossglockner Schleichabfart (38 min)

The plates were removed from the rim after the test.

In a second step, a lab soiling mixture was prepared by mixing 10 g standard Bitumen 5070, 5 g Standard Carpet dry Soil SPS 2001 (3M), 4 g NaCl and 81 g heptane. The lab soiling mixture was sprayed onto the test plates using a pump spray to get dirty sprinkles In a third step, the soiled test panels were placed into a humidity chamber at 80° C. and 98% humidity for 210 hours.

Finally, the soiled test panels were conditioned at RT for 2 days. The soil was removed with a dry paper wipe. The test results were recorded as −1 (worse than untreated sample), 0 (equal to untreated sample, stain cannot be removed), 1 (minor part of the stain can be removed), 2 (most of the stain can be removed) and 3 (all of the stain can be removed).

Soiling Test 2

A mixture of 1 g standard Bitumen 5070 (available from Dortmunder Gussasphalt GmbH, Germany), 12 g Standard Carpet soil SPS 2001, 5 g sodium chloride, 1 g brake dust in 81 g heptane was prepared. The solution was sprinkled onto the coated test panels with a pipette and allowed to dry for 1 hour. The test panels were put in a climate chamber at 80° C. and 98% humidity during 24 hours.

After the aging step the plates were allowed to condition for at least 2 h and cleaned using a commercial steam blaster (the cleaning was carried out at a car wash.)

A visual rating was given varying from −1 to +3 (same as for the soiling test 1 mentioned above).

High Pressure Cleaning Cycle (HP Clean)

In the high pressure cleaning cycle, soiling test 1 was used, but instead of using a paper wipe to clean the test panel, the panel was cleaned with one pass of a high pressure water jet. The soiling with subsequent high pressure cleaning was identified as one cycle. A visual rating was given varying from −1 to +3 (same as for the soiling test 1 mentioned above) after one cycle (indicated as HP Clean 1) or after two soiling/cleaning cycles (indicated as HP clean 2)

EXAMPLES

Examples 1 to 6, Controls C-1 and C-2 and Reference Ref-1

In examples 1 to 6 a coating composition was made by blending 9 parts (by solids) SIL-1 (42% solids in ethanol) with 1 part (by solids) polymer PHSIL-3 to PHSIL-8 respectively (all at 50% solids in MEK). Control 1 (C-1) was made with PHSIL-4, without addition of SIL-1. Control 2 (C-2) was made with SIL-1, without addition of PHSIL-5. The coating mixtures were applied to powder coated aluminum plates as described in the general coating procedure. As a reference, untreated test panels were used. The panels were tested according to the procedures for bitumen test and soiling test 1. The results are given in table 2.

| Example | Treating composition | Bitumen test | Soiling test 1 |
|---|---|---|---|
| 1 | PHSIL-3 + SIL-1 | 3 | 3 |
| 2 | PHSIL-4 + SIL-1 | 3 | 2 |
| 3 | PHSIL-5 + SIL-1 | 3 | 2 |
| 4 | PHSIL-6 + SIL-1 | 3 | 2 |
| 5 | PHSIL-7 + SIL-1 | 2 | 2 |
| 6 | PHSIL-8 + SIL-1 | 3 | 3 |
| C-1 | PHSIL-4 | 1 | 1 |
| C-2 | SIL-1 | 2 | 0 |
| Ref-1 | / | 0 | 0 |

Examples 7 to 9

Example 7 was made as follows: in a three necked flask of 500 ml, fitted with a stirrer, thermometer, condenser and heating mantle were placed 133 g dry ethanol, 83.1 g (0.0522 moles) SIL-3, 19.8 g (0.165 moles) DDS, 27.3 g PHSIL-3, 12.6 g (0.0606 moles) TEOS and 20.7 g (0.0936 moles) APTES. Under vigorous stirring 2.49 g demineralized water and 1.26 g formic acid were added. The reaction was continued at 50° C. for 20 hours under nitrogen atmosphere. The reaction mixture was cooled down to room temperature.

Examples 8 and 9 were made according to the same procedure, but APTES was added in a subsequent step under stirring at room temperature. The composition of the examples is given in table 3.

The treating compositions were applied to powder coated aluminum panels according to the general method. The results of bitumen test and soiling test 1 are given in table 3.

| | Weight % | | |
|---|---|---|---|
| Compound | Ex 7 | Ex 8 | Ex 9 |
| PHSIL-3 | 9.1 | 9.1 | 8.7 |
| SIL-3 | 27.7 | 27.5 | 23.1 |
| DDS | 6.6 | 6.6 | 6.9 |
| TEOS | 4.2 | 4.1 | 5.8 |
| Al[OCH(CH$_3$)C$_2$H$_5$]$_3$ | / | 5.5 | 5.8 |
| APTES | 6.9 | 2.1 | 2.2 |
| EtOH dry | 44.3 | 44 | 46.2 |
| H$_2$O | 0.83 | 0.82 | 0.87 |
| HCOOH | 0.42 | 0.41 | 0.43 |
| Bitumen test | 3 | 3 | 3 |
| Soiling test 1 | 3 | 3 | 3 |

Examples 10 to 13

In examples 10 to 13, mixtures were made containing SIL-2 and polymers as indicated in the table below. All samples had a solids ratio of SIL/PHSIL 10:1. The compositions were conditioned for 24 hours prior to application to powder coated aluminum panels according to the general method outlined above. The treated samples were tested 24 hours after coating. The results of bitumen test and soiling test 2 are given in table 4.

| Ex | SIL | PHSIL | Bitumen test | Soiling test 2 |
|---|---|---|---|---|
| 10 | SIL-2 | PHSIL-1 | 3 | 1 |
| 11 | SIL-2 | PHSIL-10 | 3 | 1 |
| 12 | SIL-2 | PHSIL-11 | 3 | 3 |
| 13 | SIL-2 | PHSIL-2 | 3 | 3 |

Examples 14 to 23

In examples 14 to 23, mixtures were made containing SIL-2 and PHSIL-3 or PHSIL-9 optionally in combination with surfactants as indicated in the table below. All samples had a solids ratio of SIL/PHSIL 10:1 or SIL/PHSIL/SURF 10:1:1. A control example C-3 was made with 100% SIL-2. The compositions were conditioned for 24 hours prior to application to powder coated aluminium panels according to the general method outlined above. The treated samples were tested 24 hours after coating. The results of bitumen test and High pressure test are given in table 5.

| Ex | SIL | PHSIL | SURF | Bitumen test | High Pressure cleaning 1 | High Pressure cleaning 2 |
|---|---|---|---|---|---|---|
| 14 | SIL-2 | PHSIL-3 | / | 3 | 2 | 1 |
| 15 | SIL-2 | PHSIL-3 | SURF-1 | 3 | 3 | 2 |
| 16 | SIL-2 | PHSIL-3 | SURF-2 | 3 | 2 | 2 |
| 17 | SIL-2 | PHSIL-3 | SURF-3 | 3 | 2 | 2 |
| 18 | SIL-2 | PHSIL-3 | SURF-4 | 3 | 2 | 1 |
| 19 | SIL-2 | PHSIL-9 | / | 3 | 2 | 2 |
| 20 | SIL-2 | PHSIL-9 | SURF-1 | 3 | 3 | 2 |
| 21 | SIL-2 | PHSIL-9 | SURF-2 | 3 | 3 | 3 |
| 22 | SIL-2 | PHSIL-9 | SURF-3 | 3 | 3 | 3 |
| 23 | SIL-2 | PHSIL-9 | SURF-4 | 3 | 3 | 3 |
| C-3 | SIL-2 | / | / | 0 | 1 | 1 |

Examples 24 to 28

In examples 24 to 28, mixtures were made containing SIL-2 and PHSIL-12 to PHSIL-16 as indicated in the table below. All samples had a solids ratio of SIL/PHSIL 10:1. The compositions were conditioned for 24 hours prior to application to powder coated aluminium panels according to the general method outlined above. The treated samples were tested 24 hours after coating. The results of bitumen test are given in table 6.

| Ex | SIL | PHSIL | Bitumen test |
|---|---|---|---|
| 24 | SIL-2 | PHSIL-12 | 3 |
| 25 | SIL-2 | PHSIL-13 | 3 |
| 26 | SIL-2 | PHSIL-14 | 3 |
| 27 | SIL-2 | PHSIL-15 | 2 |
| 28 | SIL-2 | PHSIL-16 | 3 |

The invention claimed is:

1. Method of treatment comprising (i) applying a treatment composition to at least a portion of the surface of a wheel rim and (ii) allowing a thus applied treatment composition to cure, said treatment composition comprising dissolved or dispersed in an organic solvent:
   (a) at least one polymer comprising a segment selected from a polysiloxane segment or a fluorinated segment, said polymer having at least one —SiY functional group wherein Y represents a hydrolysable group and wherein said —SiY group is comprised in end groups of the polymer and/or side groups of said polymer, wherein said polymer is a polysiloxane based polymer comprising repeating units of the formula —(R)$_2$SiO—, wherein R represents an alkyl group of 1 to 4 carbon atoms or an aryl group; and
   (b) at least one hydrolysable silane corresponding to the formula (I) or hydrolysates or condensates thereof:

$$Q_n SiG_{4-n} \quad (I)$$

wherein Q represents a hydrocarbon group that can optionally be substituted, G represents a hydrolysable group and n is 0, 1 or 2; or as an alternative to or in addition to components (a) and (b),
   (c) condensation products of (i) said polymer and (ii) said hydrolysable silane according to formula (I) or hydrolysates or condensates of said hydrolysable silane according to formula (I).

2. Method according to claim 1 wherein the polymer comprises polysiloxane segments and wherein said segments have an average number of SiO units of 5 to 200.

3. Method according to claim 1 wherein said composition further comprises a polysiloxane based surfactant.

4. Method according to claim 1 wherein said polymer comprises one or more reaction products of (i) a polysiloxane of which the end groups comprise an isocyanate reactive group, (ii) a di-isocyanate and (iii) an organic compound having (a) at least one —SiY group wherein Y has the meaning as defined, and (b) an isocyanate reactive group.

5. Method according to claim 1 wherein said polymer comprises one or more reaction products of a free radical reaction of an ethylenically unsaturated monomer having at least one —SiY group in the presence of a polysiloxane having two or more mercapto groups.

6. Method according to claim 1 wherein said polymer further comprises one or more segments of a polyoxyalkylene in which the oxyalkylene units have from 1 to 4 carbon atoms.

7. Method according to claim 1 wherein said surface of said wheel rim to which said composition is applied comprises an organic coating.

8. Method according to claim 1 wherein the composition further comprises a compound having at least one —Si-$G^1$ functional group wherein $G^1$ represents a hydrolysable group and wherein said compound does not contain polysiloxane segments or segments that are fluorinated.

* * * * *